(12) United States Patent
Johnson et al.

(10) Patent No.: US 8,956,145 B2
(45) Date of Patent: Feb. 17, 2015

(54) THREE DIMENSIONAL VARIABLE FORMING APPARATUS AND METHODS OF USE THEREOF

(75) Inventors: Brent Johnson, Elk Ridge, UT (US); Ken Hardman, Pleasant Grove, UT (US); Leslie Johnson, Elk Ridge, UT (US); Caleb Waugh, Grand Junction, CO (US); Jonathan Woahn, Pleasant Grove, UT (US); Tyson Triplett, Provo, UT (US); Eric Radford, Woodlands, TX (US); Dean Keith Stolworthy, Henderson, NV (US); Karl M. Taylor, Tualatin, OR (US); Brad Hyatt, Rochester, NY (US); Jeffrey Webster, Pleasant Grove, UT (US); James Kearl, Greensboro, NC (US); David Matsumura, Chicago, IL (US)

(73) Assignee: Iterations Inc., Elk Ridge, UT (US)

( * ) Notice: Subject to any disclaimer, the term of this patent is extended or adjusted under 35 U.S.C. 154(b) by 698 days.

(21) Appl. No.: 12/383,822

(22) Filed: Mar. 27, 2009

(65) Prior Publication Data
US 2009/0273109 A1 Nov. 5, 2009

Related U.S. Application Data

(60) Provisional application No. 61/039,854, filed on Mar. 27, 2008, provisional application No. 61/074,776, filed on Jun. 23, 2008.

(51) Int. Cl.
*B29C 43/56* (2006.01)
*B29C 43/10* (2006.01)
(Continued)

(52) U.S. Cl.
CPC ............... *B29C 43/10* (2013.01); *A43B 17/00* (2013.01); *A43D 1/02* (2013.01); *A43D 1/025* (2013.01);
(Continued)

(58) Field of Classification Search
CPC .................................................... B29C 43/56

USPC ...................... 425/387.1, 398–389, 112, 394
See application file for complete search history.

(56) References Cited

U.S. PATENT DOCUMENTS

| 4,999,143 A | 3/1991 | Hull et al. |
| 5,151,277 A * | 9/1992 | Bernardon et al. ........... 425/112 |

(Continued)

FOREIGN PATENT DOCUMENTS

| KR | 10-0257135 | 8/1990 |
| WO | 89/10254 | 11/1989 |

OTHER PUBLICATIONS

International Search Report for International Application No. PCT/US2009/001899, dated Nov. 24, 2009 (7 pages).
(Continued)

*Primary Examiner* — Larry Thrower
*Assistant Examiner* — Xue Liu
(74) *Attorney, Agent, or Firm* — TraskBritt, P.C.

(57) ABSTRACT

The disclosed systems and methods include a mold assembly having a malleable mold (4), a moldable blank (2) and a bladder (1) positioned about the moldable blank (2) to transmit an external force applied to the mold assembly uniformly to the moldable blank (2) and hence to the malleable mold (4). The invention further includes a method of replicating a surface by use of the mold assembly. The method may include manipulating the malleable mold (4) to record the image to be replicated. This manipulation may include a physical engagement of the mold with a physical surface to be replicated. Alternatively, an image, e.g., photograph or laser scan of the surface may be transmitted to a computer numerically controlled ("CNC") system. The CNC system then manipulates the malleable mold (4) to reflect the surface to be replicated. An activated moldable blank, e.g., a blank (2) fabricated from a thermo-forming material, is then positioned over the malleable mold. The bladder (1) is then secured about the moldable blank (2). An external force, such as that induced by placing the mold assembly in a vacuum chamber, is then applied to the mold assembly.

8 Claims, 13 Drawing Sheets

(51) Int. Cl.
*A43B 17/00* (2006.01)
*A43D 1/02* (2006.01)
*B29C 33/30* (2006.01)
*B29C 43/02* (2006.01)
*B29C 43/36* (2006.01)
*B29D 35/12* (2010.01)
*B29C 33/20* (2006.01)
*B29L 31/50* (2006.01)

(52) U.S. Cl.
CPC ............. *B29C 33/308* (2013.01); *B29C 43/021* (2013.01); *B29C 43/3642* (2013.01); *B29D 35/122* (2013.01); *B29D 35/128* (2013.01); *B29C 33/20* (2013.01); *B29C 2043/023* (2013.01); *B29C 2043/3644* (2013.01); *B29C 2043/3649* (2013.01); *B29C 2043/3665* (2013.01); *B29L 2031/50* (2013.01)
USPC ........................................................ 425/394

(56) References Cited

U.S. PATENT DOCUMENTS

| | | | |
|---|---|---|---|
| 5,464,337 A * | 11/1995 | Bernardon et al. | 425/112 |
| 5,513,972 A | 5/1996 | Schroeder et al. | |
| 5,796,620 A * | 8/1998 | Laskowski et al. | 700/197 |
| 6,484,776 B1 * | 11/2002 | Meilunas et al. | 156/382 |
| 7,019,898 B2 * | 3/2006 | Page | 359/451 |

OTHER PUBLICATIONS

Munro et al., Reconfigurable Pin-Type Tooling: A Survey of Prior Art and Reduction to Practice, Journal of Manufacturing Science and Engineering, Jun. 2007, pp. 1-15, vol. 129.

"Welcome to the SME webinar on 'Using Reconfigurable Pin Tooling for Plastics and Composites Manufacturing,'", Presenter: Daniel F. Walczyk, Ph.D. PE, Jul. 23, 2009, Sponsor: Plastics Tooling & Mold Design Tech Group, www.sme.org/plasticstooling.

PCT International Preliminary Report on Patentability, PCT/US2009/001899, dated Sep. 28, 2010.

PCT International Preliminary Report on Patentability for PCT/US2009/001899 dated Sep. 28, 2010.

* cited by examiner

THREE DIMENSIONAL VARIABLE FORMING APPARATUS AND METHODS OF USE THEREOF

PRIORITY CLAIM

This application claims the benefit of U.S. Provisional Patent Application Ser. No. 61/039,854, filed Mar. 27, 2008 and U.S. Provisional Patent Application Ser. No. 61/074,776, filed Jun. 23, 2008, which are incorporated herein by this reference in their entireties.

TECHNICAL FIELD

The present invention relates generally to three dimensional surface forming apparatus and methods for using such apparatus. These apparatus and methods could be used in various environments to produce a variety of articles of different configurations. For example, the apparatus and methods could be used to form custom foot orthotics.

BACKGROUND

Methods of replicating a three dimensional surface are well known. Many of these methods utilize, as part of the process, a molding apparatus having a housing which includes a plurality of pins are arranged for displacement relative to the housing. The surface to be replicated is brought into engagement with the ends of the plurality of pins and an amount of force is applied to the pins by the surface sufficient to cause the pins to be displaced relative to the housing. Due to this displacement, the ends of the displaced pins, whether the ends which engage the surface or the opposing ends, define a configurational surface which can then be replicated. One difficulty which has been encountered in the use of such molding apparatus is the ease with which the configurational surface may be distorted, damaged or even deleted. Since the pins are mounted to be easily displaced by their engagement with a surface to be replicated, the user must be very careful with the configurational surface bearing mold in that any slight movement of the mold may cause the pins to be displaced again. In order to preserve the configurational surface such that it can be utilized in a molding process, such molding assemblies typically having a means for locking the pins in place after their displacement to define the configurational surface thereby preserving the configurational surface.

Conventional molding assemblies tend to be complicated structurally and difficult to work with. Their construction and operation necessitates considerable operator time and effort for their proper operation. Due to the complexity of their construction, their operation can be subject to breakdowns and oftentimes the end result of their use tends to be disappointing.

There exists a need for a molding apparatus and method of simple construction which can readily replicate configurational three dimensional surfaces while avoiding many of the weaknesses of the known art.

DISCLOSURE OF THE INVENTION

The system of the invention, in its most abbreviated form, defines a molding assembly. In one embodiment, the molding assembly includes a malleable mold; a first bladder, and a moldable blank. A first surface of the malleable mold is adapted to record a configurational surface which is desired to be replicated. The moldable blank is then positioned in physical proximity to the first surface of the malleable mold. The first bladder is positioned in a physical engagement with the moldable blank. In some embodiments, the moldable blank is positioned in direct physical contact with the first surface of the malleable mold. In other embodiments, a further structural element may be included in the system. This additional structural element, hereinafter referred to as a smoothing element or layer, is interposed between the malleable mold and the moldable blank, as a means of smoothing or otherwise rectifying any surface discontinuities which may exist on the first surface of the malleable mold. In some embodiments a second bladder is also provided. This second bladder is positioned in physical engagement with the malleable mold. The first bladder and the second bladder are positioned such that the malleable mold and the moldable blank are positioned between, i.e., intermediate, the two bladders. The association of the two bladders, the malleable mold and the moldable blank forms another embodiment of a molding assembly of the invention.

The molding assembly may, in some embodiments, be arranged so that a vacuum can be drawn between the two bladders, thus the molding assembly actually forms part of a vacuum chamber. In this embodiment, once a vacuum is created within the chamber, compressive forces are applied to the malleable mold and the moldable blank through intermediation of the two bladders thereby causing the malleable mold to impart to the moldable blank, the reverse of a preselected configurational surface, which is carried on the first surface of the malleable mold.

In those embodiments which utilize a smoothing element, discontinuities on the surface of the malleable mold are mollified, if not eliminated, as the impression of the configurational surface, carried by the malleable mold, is transmitted through the smoothing element to the moldable blank.

In those embodiments which utilize two bladders, the bladders are positioned relative to the malleable mold and the moldable blank such that upon an application of vacuum between the first and second bladder, the first and second bladders function to substantially distribute the forces applied to the malleable mold as well as the moldable blank, resulting from the vacuum, in order to preclude a substantial distortion of the malleable mold.

The invention also includes a method of using the mold assembly and system described above. The method includes the steps of:

(1) defining a configurational surface to be molded into a moldable blank;

(2) providing a malleable mold;

(3) recording the configurational surface in a first surface of the malleable mold;

(4) positioning a moldable blank proximate the first surface;

(5) positioning a first bladder in engagement with said moldable blank, (6) applying a force to the malleable mold, moldable blank, and first bladder for a sufficient period of time to cause said configurational surface to be imparted to said moldable blank.

Although the various aspects of the method have been set forth as steps and listed in a specific order, it should be understood that the method of the invention is not limited to these specific aspects nor is the method limited to the indicated ordering of these aspects. Instead this description has been provided as being illustrative of the invention, with the claims of the application constituting the sole limitations of the scope of the invention.

MODE(S) FOR CARRYING OUT THE INVENTION

The instant invention is directed to a system as well as a method for producing articles. The system and method will be described by reference to a system and method for producing foot orthotics for use by human patients. Although the invention will be illustrated by using this particular embodiment of the system and method, it should be appreciated that the invention may find application for the production of articles which are quite different both structurally and operationally from foot orthotics. Accordingly, the following description should not be viewed as being restrictive of the scope of the invention. Instead, the scope of the invention is solely defined by the claims appended hereto.

Figure 1:
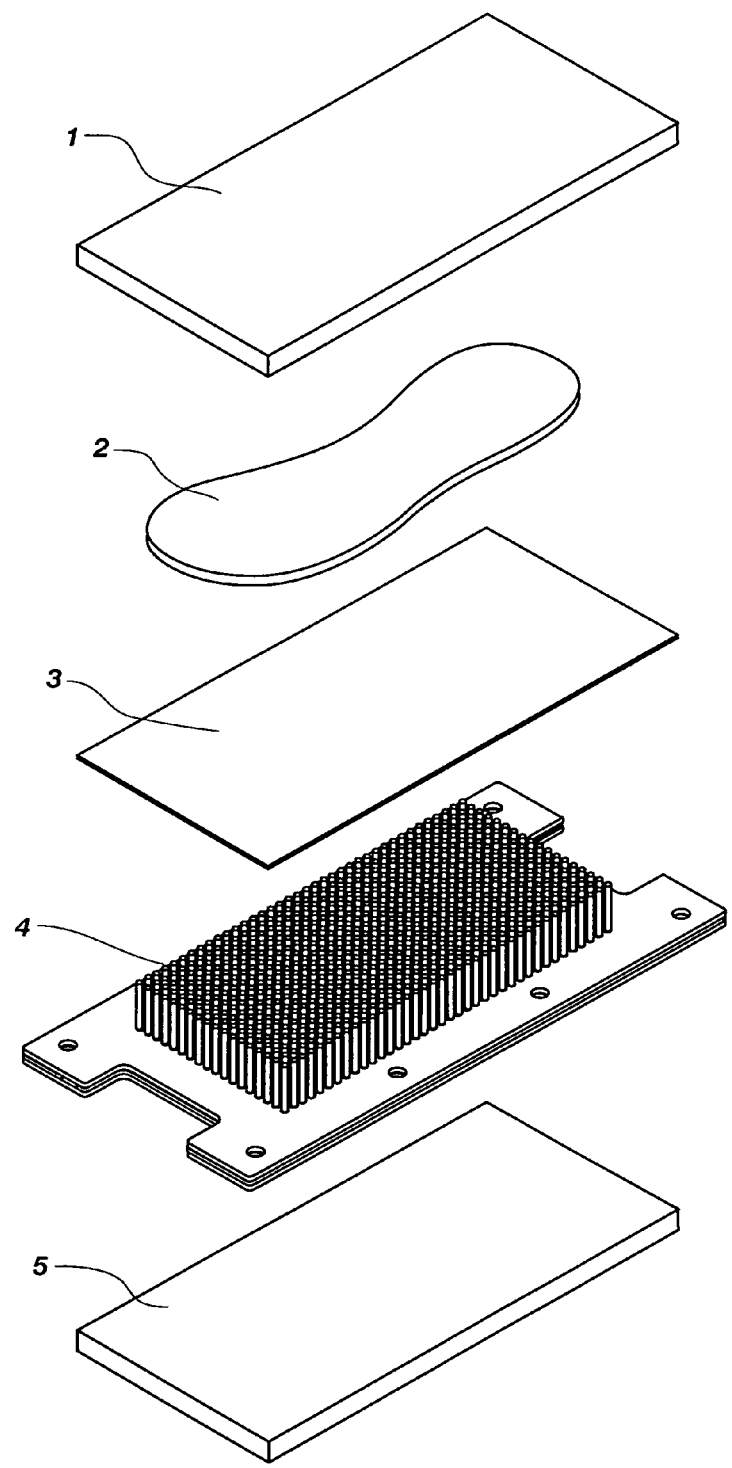
FIG. 1 is an exploded view of a mold assembly of the instant invention.
Figure 2:
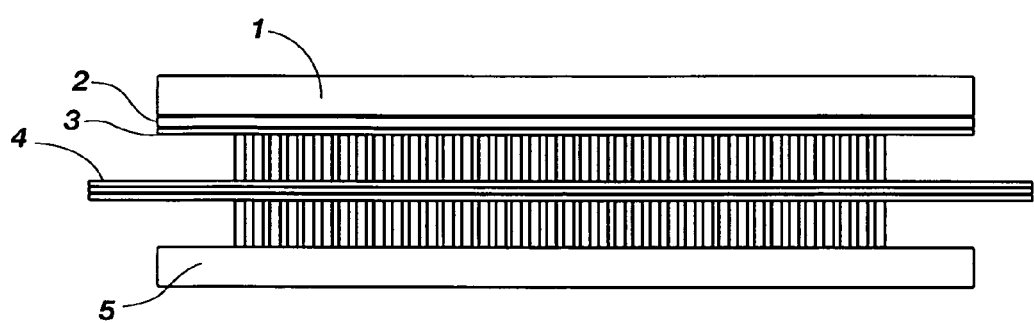
FIG. 2 is a side view of the mold assembly of FIG. 1.

FIGS. 1 and 2 illustrate a molding assembly of the invention. As shown a first bladder 1 is positioned in physical engagement with a moldable blank 2. In turn the moldable blank 2 engages a smoothing layer 3. It should be understood that the smoothing element or layer 3 is an optional element of the invention. Embodiments may either use or not use such a smoothing layer 3 depending on the particular product being molded and the physical nature of the pin mold 4. The smoothing layer 3 engages a malleable mold 4, which in the illustrated embodiment is a pin mold 4. The pin mold 4 is positioned in engagement with a second bladder 5. In those embodiments which do not utilize a smoothing layer 3, the moldable blank 2 would be positioned in direct engagement with the pin mold 4.

Both the second bladder 5 and the first bladder 1 may be substantially similar in construction. Both bladders function to transmit forces generated outside of the mold assembly to one or more of the elements of the mold assembly. For example, the first bladder 1 transmits exterior generated forces to the moldable blank 2 and the second bladder 5 transmits exterior forces to the malleable mold 4. Both bladders are designed to distribute the force applications to their respective mold assembly elements in a manner which avoids concentrating those force applications to particular portions of the respective mold assembly elements. By distributing the forces over the surface of a respective mold element the bladder functions to avoid, if not preclude, force applications which would, in the case of the pin mold, distort the exterior surface, or more specifically the configurational surface of the pin mold 4, or in the case of the moldable blank, alter the shape being imparted to the blank.

Each bladder 1 and 5 may include a sheet of material, e.g., polymeric material, which is capable of uniformly distributing forces applied to the bladder. In preferred constructions, the thickness of the bladder as well as the durometer rating of the material which is used to fabricate the bladder are selected responsive to the nature and characteristics of the pin mold 4, smoothing element 3 and moldable blank 2 which form the molding assembly. In some constructions a bladder 1 and 5 may define a hollow interior which may be filled with either a gaseous fluid, liquid or a flexible solid such as silicone. Bladder constructions which utilize a flexible material such as foam are also within contemplation of the invention. The invention contemplates two bladders which are constructed to be positioned on the ends of the mold assembly and function to transmit exteriorly generated forces to those mold assembly elements in contact with the bladders so as to distribute those forces generally uniformly over the surface of the mold assembly elements thereby avoiding distortions in those mold elements which may otherwise arise from increased force applications over selected areas of the mold elements. Any type of material, which, if functional to accomplish these objectives, is within the contemplation of the invention.

Figure 3:
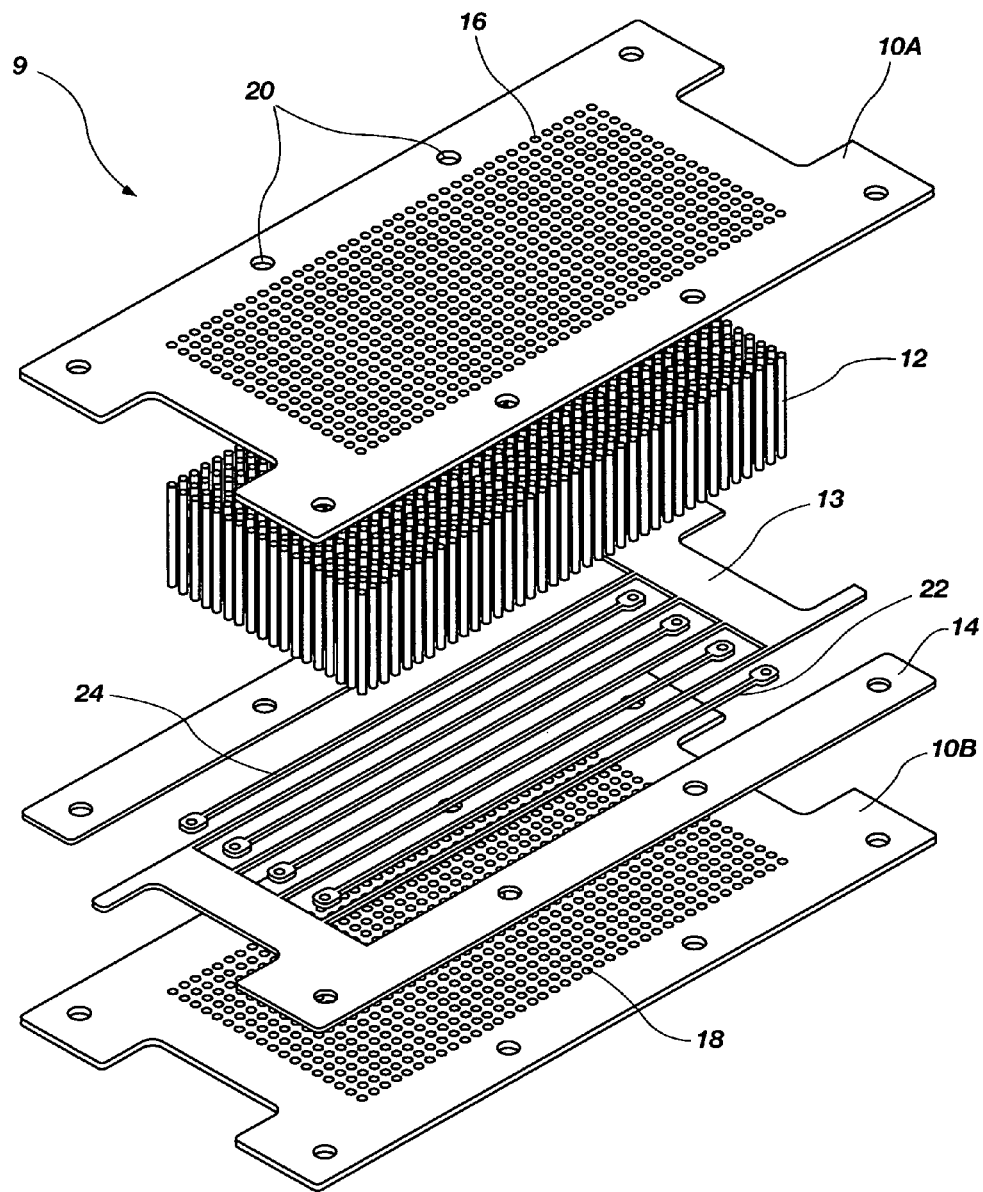
FIG. 3 is an exploded view of a pin mold of the invention.

The pin mold 4 includes a pair of substrate frame elements 10A and 10B, as shown to advantage in FIG. 3. Each of these frame elements defines a planar upper surface and lower surface. A plurality of apertures 16 and 18, arranged in linearly disposed horizontal rows, are defined in the central region of frame elements 10A and 10B. The plurality of apertures defines a matrix in each frame element. The pins are therefore encapsulated in unique matrices to enable isolation of the pins 12 one from another.

It should be understood that frame element 10B is substantially similar to frame element 10A with respect to the arrangement of the apertures. In preferred constructions these apertures are spaced approximately one quarter of an inch (0.565 centimeters) or less apart from one another. Stated otherwise, the distance from the center of each aperture to the center of an adjacent aperture is one quarter of an inch (0.565 cm). This spacing is of course dependent on the dimensions of the pins to be used in the pin mold 4 as well as the dimensions of any end or head structure which may be associated with the respective pins, and can also be varied by using different combinations of bladder thickness and durometer Each of the frame elements 10A and 10B also define apertures 20 spacedly positioned about the perimeter of the frame. Each of these apertures 20 is positioned to align with a counterpart aperture 20 defined within the body of the opposing frame element such that upon the two frame elements being brought into alignment, a securement element, e.g., a nut and bolt arrangement, may be associated with the pair of aperture to form a means of interconnecting the two frame elements to one another in a fixed relationship.

Figure 6:
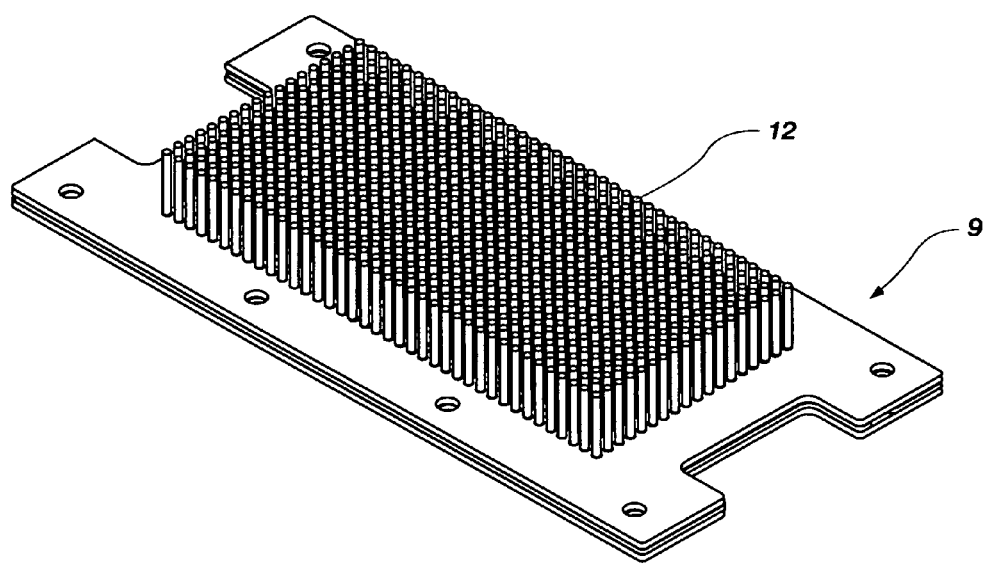
FIG. 6 is a perspective view of a pin mold of FIG. 3.
Figure 7:
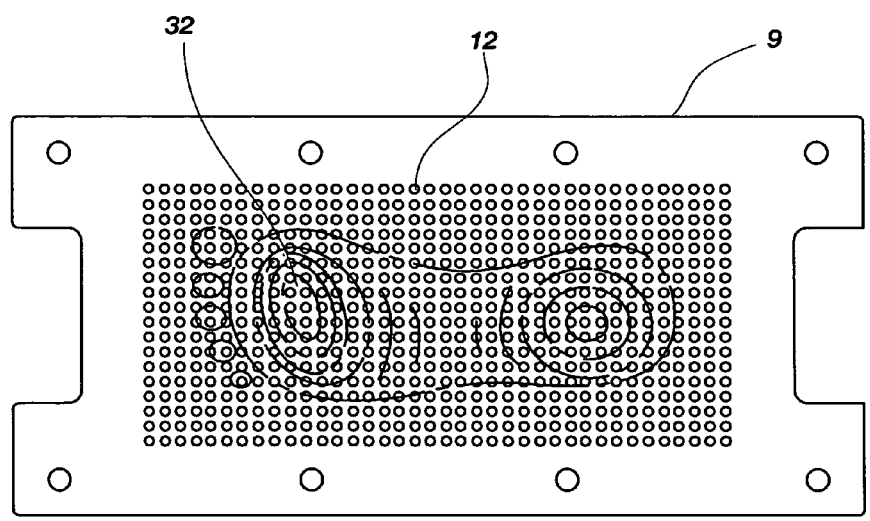
FIG. 7 is a top plan view of a impression produced in a pin mold due to an engagement with a user's foot.
Figure 8:
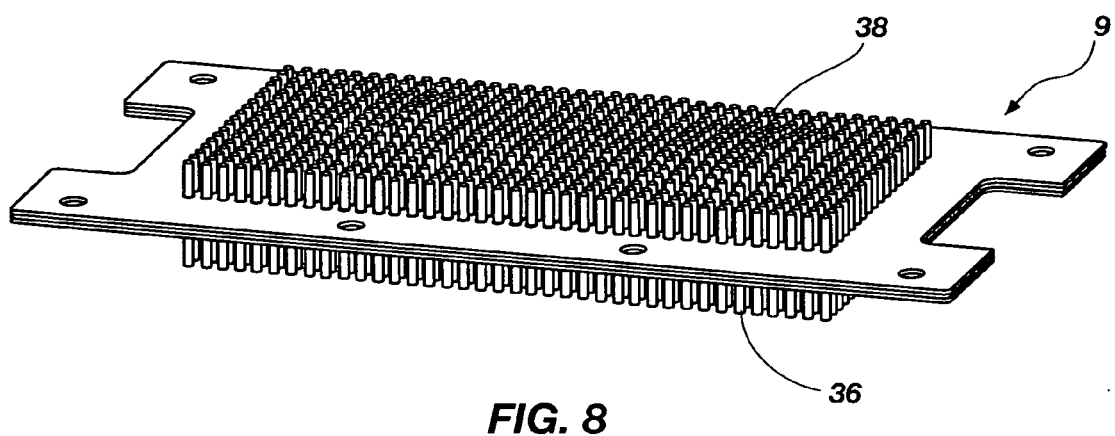
FIG. 8 is a reverse impression produced in a pin mold due to the engagement of the pin mold with a user's foot.
Figure 9:
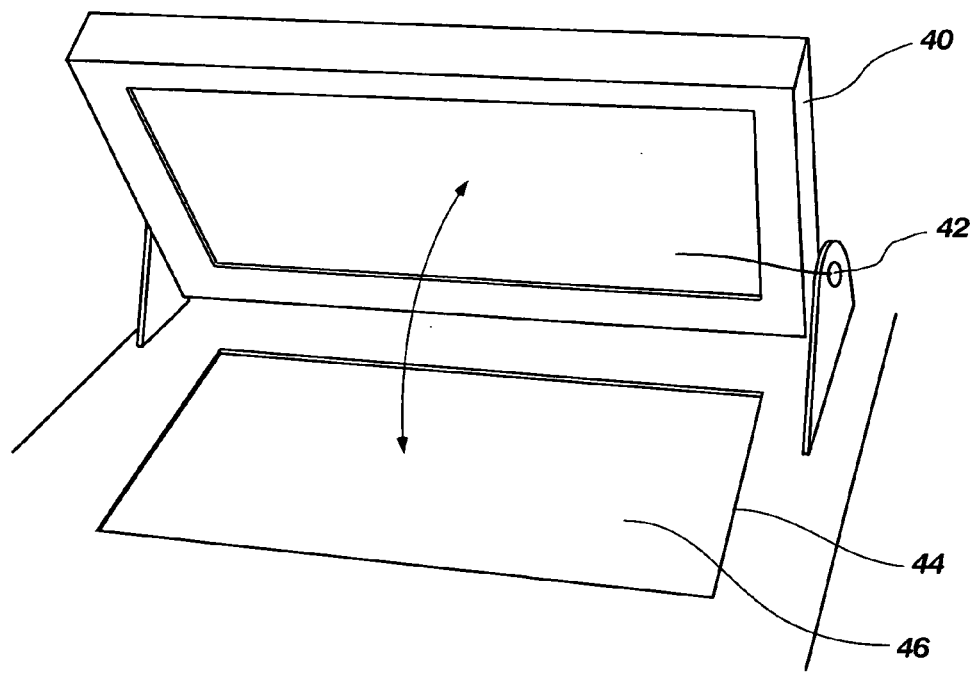
FIG. 9 is a perspective view of a vacuum chamber of a type usable with the instant invention.
Figure 10:
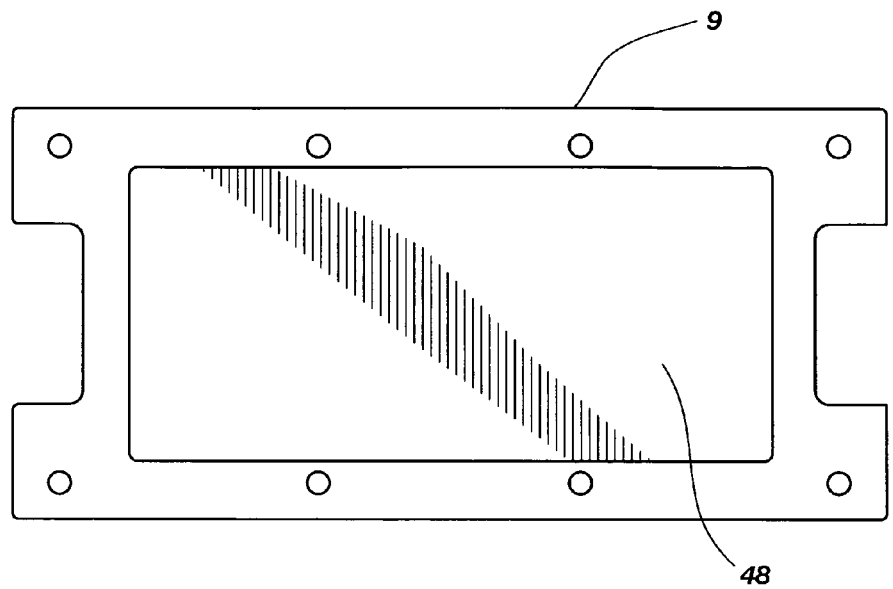
FIG. 10 is a plan view of a pin mold and a smoothing element of the invention.
Figure 11:
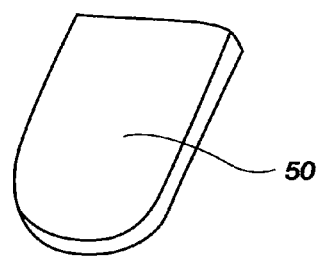
FIG. 11 is a perspective view of a moldable thermo-setting blank of the invention.
Figure 12:
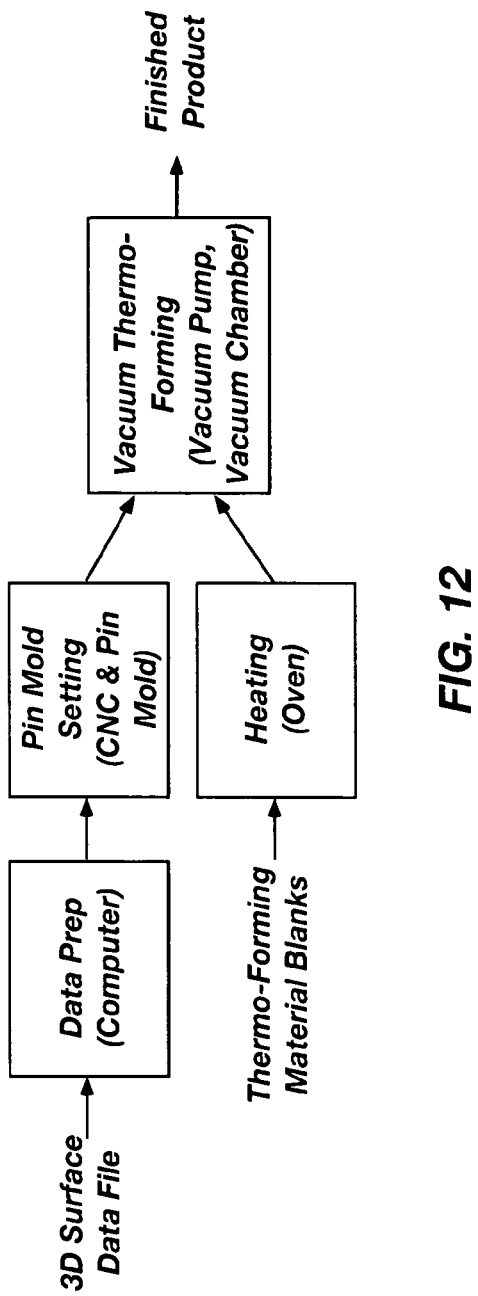
FIG. 12 is a flow chart which identifies the procedural steps in producing a molded product utilizing a computer numerically controlled machine.

FIGS. 3 and 6 illustrate the pins 12 which form part of the pin mold 4. As shown each of the pins 12 is a solid member which is substantially cylindrical in configuration. The opposing ends of each pin 12 may be planar in configuration or alternatively each end may be somewhat curved in shape. In this embodiment, all of the pins 12 have essentially an identical length, although this is not a necessary element of the invention. In other embodiments of the invention, the lengths of the pins may dimensionally vary. Each pin 12 is positioned within a respective pair of apertures 16 as defined within the frame 10A and 10B. The diameter and hence the cross sectional area of each of the pins 12 is slightly smaller than the diameter or cross sectional area of the aperture 16 which retains that pin. This dimensioning facilitates a displacement of the pin through the apertures. Each pin 12 may be fabricated from metal or some other suitable rigid material.

The ends of the pins 12, in conjunction with one another, can be viewed as forming a surface This surface is somewhat discontinuous since the pins 12 are not located contiguously to one another. Since the pins 12 are displaceable relative to the frames 10A and 10B, the user may change the configuration of the surface formed by the pin ends by displacing the pins relative to the frames 10A and 10B. A displacement of the pins 12 may be resisted by the friction creating element 14, one embodiment of which is shown in FIG. 3. Various embodiments of this particular friction creating element 14 are contemplated in the invention. In the embodiment shown in FIG. 3 two elements 13 and 14 are positioned adjacent one another. The two elements 13 and 14 are substantially identical to one another. One element 13 is oriented 180 degrees from the orientation of the other element 14. The two elements are positioned intermediate the two frame elements 10A and 10B. These elements 22 and 24 are shown to greater advantage in FIG. 5.

Figure 5:
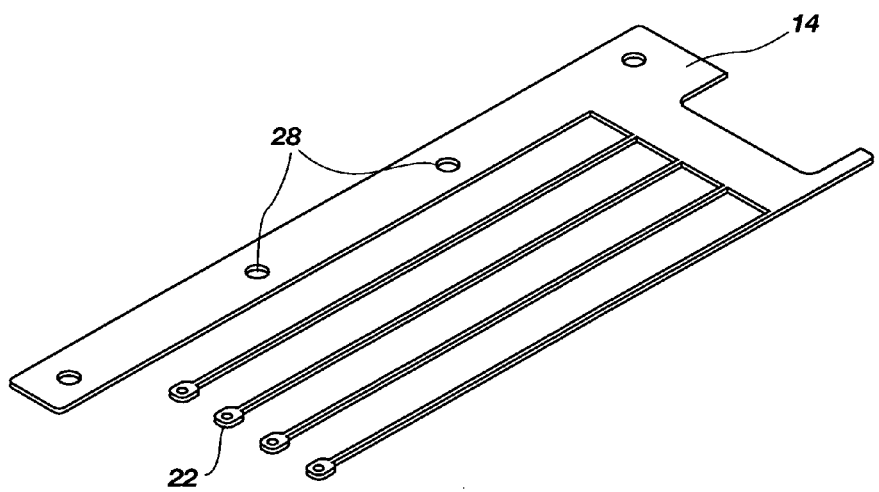
FIG. 5 is a perspective view of an intermediate friction producing element of the pin mold of FIG. 3.

Each of the elements 13 and 14 includes a frame portion as shown in FIG. 5 which defines a series of apertures 28 which pass through the frame portion. These apertures are positioned to align with the apertures 20 defined with the frame elements 10A and 10B when the mold assembly is completely assembled. Extending outward from the frame portion is a plurality of arm like members 22. Each of these members 22 includes an end which defines an aperture there through. When the two elements 13 and 14 are positioned one above the other as shown in FIG. 3, the arms 22 of the two elements are off set from one another. This arrangement functions to create channels which are laterally disposed on either side of each arm like member 22. These channels may be filled with a material which may provide some degree of frictional resistance to the pins 12. The pins pass through this material. As the pins are displaced through the apertures 16 of the frame elements 10A and 10B, the pins are displaced through the material disposed in the channels. Since the material is largely locked in place by the arm like members 22 this material produces a frictional resistance to the movement of the pins 12 through the material and hence within the pin mold 4.

In an alternative embodiment, the elements 13 and 14 are replaced by a tubular element, e.g., a tube manufactured from a material such as silicone. This tubular element is positioned between the two frame elements 10A and 10B and is arranged to extend laterally between multiple pairs of rows of pins 12. In one embodiment the tubular element is arranged in a back and forth snake-like arrangement adapted to place the tubular element in contact with all of the pins 12 which are held in place by the frame elements 10A and 10B. In one construction, the tubular element is positioned to extend between the first and second row of pins 12, upon reaching the end of those rows, the tubular element forms a 180 degree bend. The tubular element then extends between the third and forth row of pins. Upon reaching the end of those rows, a similar 180 degree turn or bend is made and the tubular element is positioned between the fifth and sixth rows of pins. This pattern is repeated until all of the rows of pins have been associated with the tubular element. By this arrangement, each of the pins 12 is positioned with at least one vertical side of the pin in a vertical, engagement with a side of the tubular element. This tubular element is manufactured from a material such as silicone, which has a suitable frictional coefficient, e.g., a material having a coefficient of friction which is suitable to oppose a gravitationally induced displacement of the pins 12 within the pin mold 4.

As the pins 12 are displaced relative to the frames 10A and 10B, the pins 12 are displaced, or dragged along or over the surface of the tubular element. The frictional resistance created by that dragging motion functions to create to a frictionally created resistant force to the displacement of the pin. This resistant force opposes the displacement of the pin and tends to retain the pin in position within the frames 10A and 10B.

In one embodiment, a low friction pin-mold apparatus may meet the following criteria:

a. Adequate friction: In one embodiment, the pins in the pin-mold must have low enough friction that it can be formed by an object without excessive force that would cause pain or make forming difficult. It must also have low enough friction so that the pins can be easily manipulated by pressing on them with one's hand, and easily returned to a zero or neutral state. Conversely, there must be adequate friction or some kind of locking mechanism that will retain the shape of the pins that the operator deems are in the correct position while the image is manipulated, scanned and digitized.

i. Silicone tubing with a low friction sleeve of material such as nylon may be used as the friction medium between the two plates that hold the pins. The pins are encapsulated in a predetermined matrix to enable later calculations of pin height from known geometry.

ii. The friction can be adjusted by different sizes and durometer of tubing, and different types of sleeve material with different friction properties.

iii. It is conceivable that an impression can be taken in a horizontal plane, so that the pins would not be subject to gravity, and an almost zero friction mold could be used. This type of apparatus would be considered in the scope of this apparatus.

iv. It is also conceivable that there could be a two state pin mold: Namely: locked and un-locked. Such a device would enable a free movement in a locked state of the pin mold. When the desired shape is achieved all or a select number of the pins could be locked in position. In addition, there are conceivably other ways to set the friction in a pin mold that would fall within the scope of this invention such as with a silicone bladder or gasket, or with other types of tubes or anti-friction materials.

b. Pin-treatment—Each pin may optionally be treated with one or more multiplicity of coatings or chemical treatments to add contrast to the image of the pin tip relative to the pin sides and pin-mold body if it is needed to get an adequate image definition for those embodiments which utilize photography or laser scanning of the pin mold as part of the method. In one embodiment, the pins move independently of one another.

The instantly described embodiment of the pin mold 4 uses double bladders and pin friction to retain the pins in position.

This embodiment requires a relatively low holding force, to maintain the pins in position, since these two sub-systems work together.

The pin mold 4 with several pins retained within a matrix meets the following criteria:
   (a) Pin isolation, when one pin is displaced or otherwise pushed, e.g., by the operation of a CNC device, only that one pin moves, and
   (b) Adequate friction, once the pins are positioned within the pin mold to record the configurational surface to be replicated, the pins can be returned to their neutral state easily when the forming process is done and the pins in the pin mold need to be reset to a neutral or zero position. However, the pin mold also provides sufficient friction resistance on the pins so they can adequately maintain their position when placed under vacuum pressure during the subsequent forming process and won't slip out of position if, for example the pin mold 4 is moved.

In addition, other embodiments are contemplated wherein a system is designed to add pin locking if necessary. If more friction force is needed, a source of pressurized fluid and valves could be associated with the tubular element that could apply and release internal tube pressure to the tubular element. In this latter embodiment introduction of pressurized fluid to the interior of the tubular element, causes that element to expand in diameter thereby causing the tubular element to be urged into a pressured engagement with the pins, which may then produce sufficient pressure against the pins that they are essentially in a locked condition. This arrangement facilitates in turn the ability to provide a locked and unlocked state for the pin mold. It is anticipated that there will be applications for this technology where significantly more holding force on the pins will be needed to achieve the necessary deformation of the base material to create the three dimensional surface.

Variations in pin mold friction material, shape, size, and properties can be implemented to support various applications.

Various pin mold spacing, diameter, and length as well as overall pin mold length, width and height can be implemented for various product sizes, curvatures, and materials.

In the case of a pin mold made from screws, not round pins, the locking would not be necessary due to the self-locking feature of the screw threads.

Variations in pin mold pin diameters, spacing, and tip shape were examined to adjust smoothing and shape resolution. In addition, though the pins were placed in a linear matrix, a diagonal pattern, non-linear, or even variable density pin mold could be designed, that could be considered alternate embodiments to the same process. The friction can be adjusted by different sizes and durometer of tubing as well.

Resetting the pins 12 to a neutral or zero state within the pin mold 4 may be done, by way of example only, by pushing they pins down with one's hand or with a simple hand roller.

Positioned in physical engagement with the pin mold 4, in some embodiments is a smoothing element or layer 3. As indicated above, this particular element is not a mandatory component in many embodiments of the invention. However, some embodiments utilize a smoothing layer 3 in order to overcome the effects of the discontinuities which results from pin mold constructions wherein the pins are not arranged contiguously to one another.

The smoothing layer 3 that is placed between the pin mold 4 and the moldable blank 2 and bridges the gap between the pins 12, works in conjunction with the top bladder and smoothes out the dimpled effect which would otherwise be produced when forming over the pins 12. Various curvatures and smoothness can be achieved by varying the thickness and durometer of the smoothing layer, varying the thickness and durometer of the proximate bladder, and placing adequate density of pin placement. This smoothing layer is also designed to maintain the shape of the underlying pins 12 so that the three dimensional surface is created within acceptable tolerance ranges. In a preferred construction the smoothing layer 3 is formed from a $^3/_{16}$ inch (0.424 cm) thick sheet of silicone material, with a durometer of 10. While silicone has been found to be a preferred material for use in the invention, similar flexible materials may also be used. Materials having a durometer of between about 5 to 40 and preferably between about 10 to about 20 durometer have been found to be of use in the invention for the curvature of feet. Higher durometer materials would be used to span greater distance between pins or to limit the curvature of the surface to be formed.

In preferred constructions the smoothing layer 3 is dimensioned to have the same width and length as the pin mold 4. Being so dimensioned the smoothing layer 3 can be positioned visually on the pin mold 4 so it covers all the pins 12. In other constructions wherein the smoothing layer is dimensioned differently from the pin mold 4, or even in those instances wherein the smoothing layer has the same dimensions as the pin mold 4, various types of positioning indicators can be incorporated into the smoothing layer in order to assist the operator in positioning the smoothing layer 3 on the pin mold 4 so as to adequately cover all of the pins 12 of the pin mold 4. Otherwise, placing some other positioning marks on the smoothing layer 3 that correspond either visually or mechanically with alignment points placed on the pin mold 4 can be used.

The use of the smoothing layer 3 and proximate bladder on a pin mold provides a unique way to achieve a smooth three dimensional surface geometry. Different low durometer materials, air bladders, and flexible metal products, could all be used in various applications of this technology to achieve the function of providing a transition between the malleable mold and the moldable blank. Basic consideration is selecting constructions for achieving this function include:
   1. Surface smoothness requirements;
   2. The magnitude of the anticipated forming force to be applied;
   3. The anticipated method of forming
   4. Pin density on the pin mold;
   5. Tolerance requirements of the three dimensional surface As described above the pin mold 4 may be manipulated in a number of ways to record thereon a configurational surface which is intended to be replicated. For example, the pin mold 4 may be physically engaged against an object having a surface which is intended to replicated. In the case of foot orthotics, the pin mold 4 may be physically engaged against the bottom of an individual's foot with sufficient pressure that the pins 12 are displaced outwardly from the engagement of a first end of the pins 12 with the individual's foot. After applying a desired degree of pressure to the first ends of the pins within the pin mold 4 by the individual's foot, the opposing ends of the pins are positioned, due to the displacement of the pins 12, to define a configurational surface which largely duplicates or approximates the shape of the individual's foot. In one embodiment of the method, a pin mold apparatus 4 is placed in a holder where a foot can be placed on the surface to obtain an image. There are a multiplicity of methods that can be used to cast the foot using this apparatus and this document is not intended to limit the scope. The most common current method is for the patient to sit on a chair in front of the device and the operator of the apparatus directs him to place his foot on the surface. Then, with the operator holding the foot in alignment, the operator assists him in creating an impression with his foot. The intervention of the operator can be for many reasons including holding the foot in alignment, ensuring the foot impression is level in the mold, controlling the amount of pressure to prevent casting in a pronated foot position, or other purposes those familiar with the art use to cast a foot.

After the impression of the foot is obtained and the foot image is in the pin mold, the operator can take the pin-mold out of the holder and visually inspect it, as well as adjust by hand any of the pins he wishes to make any corrections, re-set certain or all the pins to enable refining parts of the impression to meet needs like enhancing the arch to give medial support but still get the foot impression during full weight bearing.

In other instances, the pin mold 4 is placed on a flexible support and the individual places his foot on top of the pin mold 4 thereby applying the requisite pressure to the pins 12 so as to displace the pins 12 and eventually orient the lower ends of the pins so as to replicate the surface of the bottom surface of the individual's foot which is engaging the upper ends of the pins 12.

The impression method with this apparatus enables a tactile experience for both the operator and the patient in a semi-weight bearing modus, a true three dimensional image in a full weight bearing modus and a combination of both. The surface impression apparatus and method described herein provide certain control of the patient's foot alignment by the operator in that he or she can control the foot while it is making the impression on the pin mold. This facilitates advanced shape acquisition capabilities and shape manipulation that current modes of methods of obtaining mold impressions do not offer. The apparatus also enables a very simple hand manipulation and correction of the image after the making of the impression. This can be done simply by hand movement of any of the pins or sets of pins.

In yet other embodiments of the invention, the pin mold 4 may be manipulated to record a configurational surface to be replicated through means other than a direct physical engagement of the pin mold 4 with the surface, e.g., the bottom of an individual's foot, to be replicated. In one of these other embodiments, a digital file is prepared of the surface to be replicated. Such a digital file may be created by a digital photograph, a laser scan, or any other means which is available to record an image of the surface and thereafter translate that image into a digital file. In this alternative embodiment, the operator may take a photograph or laser scan of the patient's foot and thereafter convert this photograph or scan to a digital file. Once the impression is obtained and all the manual corrections are made, the fixed geometries of the pin-mold in relation to the digitization apparatus, enable quick and accurate digitization of the surface in a cost effective method, with a surface resolution that is adequate for certain downstream forming processes.

Once the desired 3D replication of the object and desired corrections is obtained, the operator places the pin-mold into a scanning or digitization apparatus.

With the pin-mold in the apparatus, a photo, laser or other image is taken of the pin mold.

Figure 17:
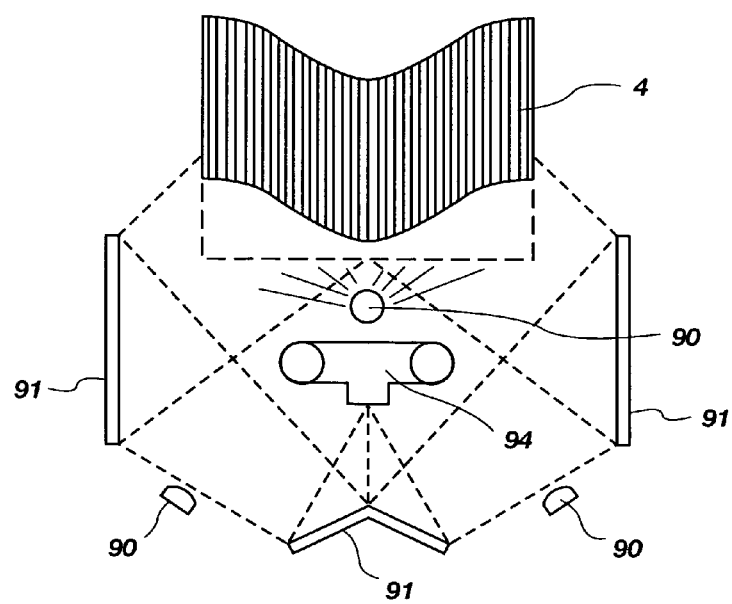
FIG. 17 is a schematic view of a photographic arrangement for photographing a pin mold.
Figure 18:
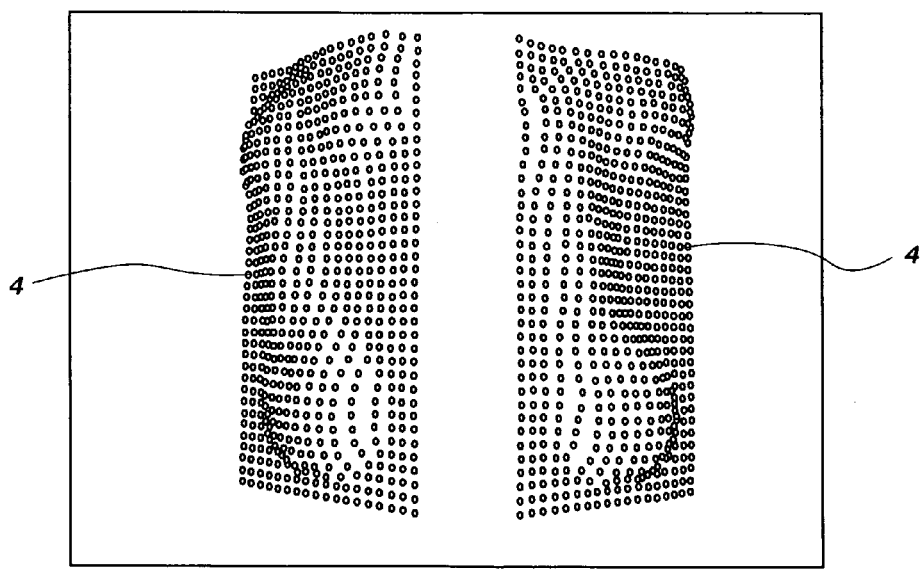
FIG. 18 is a sample photograph produced using the arrangement of FIG. 17.

The data is read into a software program that interprets the positions of the pins through a series of algorithms, and creates an output file of the image in a format that a multiplicity of downstream processes or machines can utilize to replicate the image placed into the scanning apparatus. In those embodiments wherein the pin mold is used as a basis for providing a digital file to a CNC controlled process the following apparatus may also be adapted for use with the invention:

a. Pin-mold positioning for image capture—The pin mold may be located into a box where its location can be defined. Although there are many configurations possible, in the case of this embodiment, it is located on a drawer to allow easy insertion and the prevention of debris getting into the box.

b. Lighting—A light 90 may be included to consistently illuminate all pin tips of the pin-mold, if the pin definition is necessary. In this embodiment, several small LEDs are placed inside the box for contrast enhancement and to eliminate shading. In addition, in the case where mirrors might be used, the lights may need to be shielded to not create interference of the imaging software caused by stray light reflecting off something in the box.

c. Image capture—A camera 94 or other imaging device is installed in the box with necessary resolution and other control features to capture sufficient pin tip detail to allow processing. The camera can connect by standard means to a PC or other processing device. The camera used, in one embodiment, has 2 mega-pixels of resolution. Alternate resolution may be necessary according to the needs of the scanner.

d. Optics—The camera/laser or other imaging device is placed so that it can get an adequate view of the pins. If space or hidden pins become an issue so that the camera cannot see them adequately, the pin-mold can be placed and oriented such that two simultaneous images of the pin-mold can be obtained using splitting mirrors 91 (see FIGS. 17 and 18). Each image is a picture of the same mold at two different angles. The geometric relationship of the pin-mold, camera, and optics is such as to optimize 2D image capture of the pin-mold with expected shape geometry.

Image Interpretation and Digitization Software:

a. Using software, an image of the pin-mold is captured. If necessary, when there are sharp contours, a double image (See FIG. 18) can be captured to enable good view of the curvature on both sides of the camera. An alternate embodiment is to use more than one camera. For the purposes of this embodiment, a dual image was created using simple geometry and mirrors, so the image is actually a reflection from both sides of the foot image in the pin mold. Therefore, there are two images of the pin-mold in the same picture or image file, both from different angles due to mirror placement.

b. The software then filters and adjusts the image for optimal pin isolation using a multiplicity of tools found, for example, in the LabVIEW imaging software made by National Instruments of Austin, Tex.

c. The software isolates and determines the 2D location of each pin tip in the images.
  i. Three images are used to recover the 3D geometry from the 2D image; two reference images and one actual geometry image.
  ii. The two reference images are made with all pins in a retracted position, and then again in an extended position (see FIG. 3). These two reference images of each pin are used to calculate the scale and vector relationship of each pin.
  iii. Processing is performed to distinguish pins from their neighboring pins.
  iv. Processing of the actual foot image is performed by isolating each actual pin-tip along the line between the two reference images of the respective pins.

d. Knowing the actual 3D distance between each reference pin (or plane of pins) and the 2D distance between one reference pin and its respective actual pin in 2D, the 3D position of each pin is obtained.

e. Selection of pin from best image—Since a foot or similar geometry has hills and valleys, a single image cannot capture all the beyond horizon information; some detail is out of sight of the camera. The split image resolves this issue. The software processes both images and then for each pin, selects the best image to obtain the shape information.

f. The matrix of 3D pin z-values is then stored to a file in a format suitable for downstream use and replication of the image.

Figure 19:
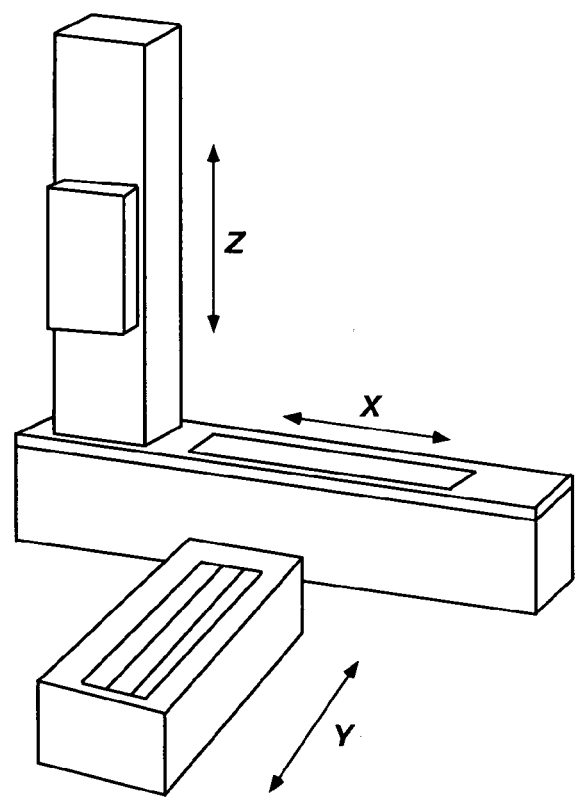
FIG. 19 is a perspective, schematic view of a CNC apparatus of the invention.

In these other embodiments, the digital file is downloaded into a microcomputer which has been programmed to process such files. The microcomputer may furthermore be associated with a computer numerically controlled (hereinafter "CNC") device. As shown in FIG. 19 the CNC includes structure for manipulating an x axis, y axis and z axis aspect of the pin mold. This association provides the user with the ability to configure the pin mold through intermediation of the microcomputer and the CNC device. In essence, the digital file provides a template from which the microcomputer can instruct the CNC device to engage the pin mold and displace the pins 12 of the pin mold 4 so as to replicate on the pin mold surface the configurational surface defined by the image in the digital file.

Computer software which is adapted to this function is commercially available. This type of software typically uses array transformations (rotations, scaling and translations), fast Fourier transform filters, array interpolation, and data smoothing to convert the three dimensional file to a correct pin mold shape. The software may also include data checking capabilities, and interpretation and correction of the data to match the pin locations. Furthermore, the software may also include the ability to smooth the data, CNC tool path and commands to operate the CNC device to replicate the three dimensional image as well as additional manipulation software that can add to or take from the surface with both a library of common manipulations, custom manipulations, and roll for posting angles. Examples of such software include but are not limited to rear and fore foot posting, metatarsal pad, lateral smoothing, and arch height manipulations. A conventional microcomputer of suitable operational capacity may be also utilized to perform the computer functions required under these embodiments of the invention.

Figure 16:
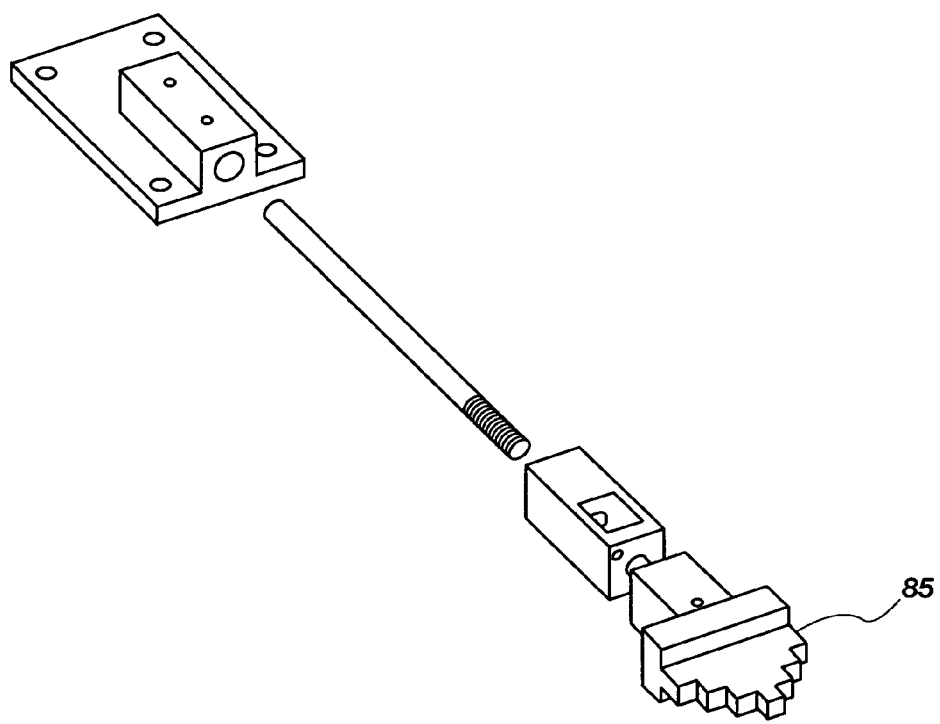
FIG. 16 is a perspective view of a stepper actuation bar for use with a CNC device.

A CNC device having the following operational characteristics has been determined to provide the requisite functionality for the invention: a CNC machine, including specialty tools that enable automated three-dimensional forming of a three-dimensional shape or surface. This may include a three axis CNC device where x and y axes position the z axis to the right locations, then the z axis moves a pin pusher to a desired height, or a rotational robot with polar coordinates. The CNC device may further include a pin-pushing tool with a stair stepper design of the type shown in FIG. 16. As shown, the stair stepper includes a pusher head 85. This makes it possible to push more than one pin 12 at a time thereby decreasing the time for configuring the pin mold 4 for use. This tool limits the distance of the down stroke necessary before moving to the next pin 12, which saves time. Furthermore, the tool has a breakaway safety feature to protect against machine crashes.

In those instances which utilize a CNC device, the orientation of the pins 12 within the pin mold 4 could be reset by inverting the pin mold in the CNC station/chamber and running a software reset algorithm. A stair-stepper type tool may be utilized to enable multiple pins to be pushed at once. In addition, such a tool was designed to be able to create, a maximum slope of 45 degrees. Additional angles could be easily achieved by making a bigger step, or eliminating the step altogether and making it a single pin at a time placement.

Other embodiments could include a roller or spherical tool as mentioned previously. This process for the product is advantageous because it can be done by hand. Also a paint roller could be used to reset the pins. The pin-mold could also be placed in the CNC station upright or inverted and a software routine executed to reset the pins.

Pin positioning, in addition to the systems and methods described above, could also be performed through the use of screw type pins. These screws would be rotated until they reached the desired height. Not only could this particular construction be operated manually but, furthermore, this construction could be implemented using the CNC device. A simple computer change to modify the z axis movement to a rotational movement, which corresponds to the pitch of the screws, as opposed to a linear displacement, would provide the desired screw (pin) height. This embodiment of the equipment would give very accurate height tolerance, and would allow for much higher forming forces to be applied when actually forming the blank into the desired shape. However, the re-setting of the pins to zero would be more difficult, as they would have to be screwed back down.

An alternative would involve the use of spline. The pin mold 2 would stay the same, but rather than pushing up each pin 12 individually, a spline with various actuators would be used to position an entire row of pins at one time. This spline method would reduce the time to form the pins into the desired configuration, and enable larger or denser pin molds to be reconfigured rapidly.

Rather than a pin pusher tool, a roller or spherical tool that uses a tool path process a three axis CNC device could be used to roll the pins into location. There are many applications where the roller method would be superior to the pin pushing method which has been described herein with respect to the production of foot orthotics.

An enhancement to any of these alternative embodiments would be to employ either higher speed and/or multiple z-axis actuators. These could be mounted to the same x-y axes driving multiple rows of pins at the same time.

A vacuum forming station wherein the two rubber bladders of the mold assembly are actually incorporated into the structure (top and bottom) of the vacuum forming station may be utilized in the instant invention. The pin mold 4 can be placed within the vacuum chamber and the vacuum chamber may be utilized to apply an exteriorly generated force to the mold assembly. Once the formed pin mold is placed in the chamber and the vacuum is applied, there is an approximately equal force applied to both above and below the pin mold.

The invention may further include an oven 62 or other device for purposes of heating moldable blanks which utilize heat as an activating means for the blank, e.g., moldable blanks 4 fabricated from thermo-setting materials. A convection oven may be employed to heat the blanks. However, other heating or curing methods may be used, such as infrared, radiation, conduction or UV light.

In addition to a vacuum chamber, other embodiments for applying pressure on the pin mold 4 include a positive pressure chamber device that puts pressure on the top and bottom sides of the pins 12, and even a method of simply stretching an elastic material over the top of the pin mold 4. Each of these methods is possible with this process of forming pins, using a smoothing layer 3, then forming a product over the top.

The method of the invention in its most elemental format is directed toward the process of molding a moldable blank to replicate a desired configurational surface. The method includes initially defining a configurational surface to be molded into an article. Thereafter, a malleable mold 2 is provided. In this context a "malleable mold" is a mold whose molding surface can be altered by the application of pressure thereto. The next step in the process is the recording of the configurational surface in a first surface of the malleable mold 2. This recording step may be accomplished by a physical engagement of the surface to be replicated with the pin mold 4 itself as described above, or alternatively, the pin mold may be manipulated by a device, e.g., a CNC device which has been programmed to reproduce within the pin mold a configuration surface which corresponds to a visual image which has been transmitted to the CNC device by means of a digital file.

Thereafter, an activated or prepared moldable blank 2 is positioned proximate to the first surface of the malleable mold 2. A first bladder 1 is positioned in engagement with the moldable blank 2 for complete the formation of a mold assembly. A force is then applied to the mold assembly and maintained over a sufficient period of time to permit the configurational surface of the malleable mold to be transmitted to the moldable blank. The force is applied substantially uniformly to the malleable mold 2 and the moldable blank 2 through intermediation of the bladder 1. Due to the action of the bladder, the force application to the malleable mold is such that the form of the mold is substantially preserved while it imparts the configurational surface to the moldable blank.

In those embodiments of the method which utilize a smoothing element 3, the smoothing element is positioned over the malleable mold prior to the positioning of the moldable blank 2 within the mold assembly. In those embodiments which utilize a pin mold as the malleable mold, the smoothing element is preferably positioned over all of the pins of the pin mold so as to minimize the dimpling effect which is otherwise produced within the moldable blank during the formation process.

In those embodiments which utilize a second bladder, the second bladder is positioned into engagement with the malleable mold subsequent to the recording of the configuration surface on that mold and prior to the placement of the activated moldable blank into engagement with the malleable mold. A smoothing element may also be introduced into the mold assembly in this double bladder mold assembly embodiment. The moldable blank 2 and the malleable mold 2 are thus positioned intermediate the first bladder 1 and the second bladder 5. With the bladders in position, a force is applied to the two bladders 1 and 5, which results, in turn, with that force being applied substantially uniformly to the malleable mold 4 and the moldable blank 2 through intermediation of the two bladders 1 and 5. Due to the action of the two bladders, the force application to the malleable mold is such that the form of the mold is substantially preserved while it imparts the configurational surface to the moldable blank.

In one preferred construction this force is applied through means of a vacuum chamber. In this preferred embodiment, a vacuum within the vacuum chamber is maintained for a sufficient period of time to cause the configurational surface to be imparted to the moldable blank due to the forces created by the vacuum.

In another preferred embodiment of the method the malleable mold 2 is formed of a frame 10A and 10B; and a plurality of pin elements 12 which are displaceably secured within the frame. Each of the pin elements 12 defines a first end and a second end. The first ends of the plurality of pin elements 12 are disposed to define a first surface. The second ends of the pin elements 12 are disposed to define a second surface.

In yet another preferred embodiment of the method the step of recording the configurational surface to be imparted to the moldable blank includes displacing the plurality of pin elements 12 relative to the frame 10A and 10B whereby the first ends of the plurality of pin elements are configured to define the configurational surface. Some embodiments of the method may include a step of positioning a smoothing layer 3 intermediate the malleable mold 2 and the moldable blank 2. Some further embodiments of the method may includes engaging the first surface of the malleable mold 2 against a surface of an object which defines the configurational surface thereon with sufficient force to cause the plurality of pin elements 12 to be displaced relative to the frame such that the surface to be replicated is substantially duplicated in the first surface.

In an alternative embodiment of the inventive method, the configurational surface to be replicated is converted into a digital image as part of the method. After identifying a three dimensional surface to be replicated, the user initially either takes a photographic image of the surface, obtains a laser scan of the surface or uses some alternative method to obtain an image of the surface which can be converted into a digital file. The photographic image or the laser scan may be obtained using conventionally available devices such as digital cameras or laser scanners. Once the image or scan has been made, the digital file containing the image or scan. A scanned foot or other three-dimensional surface data file is loaded into a computer program adapted for interfacing with the image.

The method focuses on producing the three-dimensional surface after there is a digital image. There are many processes to obtain a digital image, and the forming process described hereinafter can be adapted with relatively simple software interfacing to work with any three dimensional (hereinafter "3D") image regardless of how it was obtained. For testing purposes, 3D images were obtained with a conventionally available pressure plate scanner developed by 3DO (3 Digital Orthotics—Quasar Group).

Figure 4:
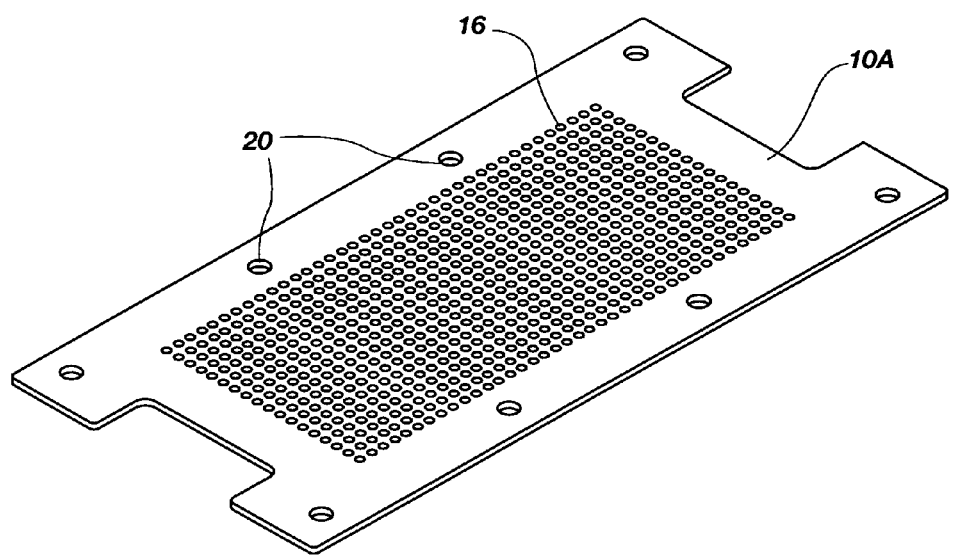
FIG. 4 is a perspective view of a substrate frame of the pin mold of FIG. 3.

The image is then manipulated through the computer and the associated software to convert it to a three-dimensional surface with x and y coordinates fixed at ¼ inch (0.565 cm) increments to match a pin mold (FIG. 4). The z value is calculated from the data file.

The image may then be displayed on a computer screen and various corrections or manipulations can be done by the operator user using the computer until the final desired image is ready. An example of such a manipulation may be an adjustment to the configurational surface to provide a modified arch support surface from the scanned or digital original.

Aligning the image to the proper location and orientation on the pin mold, as well as aligning the blank to the correct position on the smoothing layer is critical to the process. Proper alignment is obtained by manual input on the computer image during the initial stage of the process. The detailed alignment method is described below.

Figure 15:
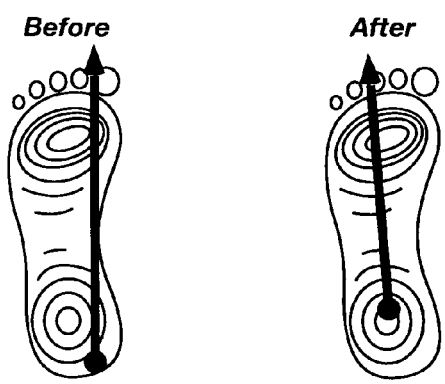
FIG. 15 is a perspective view of an adjustment done via a computer assisted molding arrangement.

When the initial image is loaded into the computer, its representation appears on the screen. In addition; visual markers appear which represents the proper location and orientation of the image to be formed. The operator of the machine then electronically moves either the graphical representation of the image in an x or y direction or the point and vector until a known reference point that image is located below the point on the screen. For example, this could be the center of the heel on a foot scan. Once the reference point on the image positioned under the point on the screen, the image or the vector is then rotated to the desired rotational orientation, and entered. FIG. 15 shows a before and after view of the point and vector in the correct orientation. This ensures that the surface image will be centered on the pin mold in the desired orientation. Other techniques to position the image in the right location and orientation can also be used, such as an image that approximates the scanned image:

After completing the processing of the image or scan the operator places a pin mold 4 in a pin setting station 56. The data from the computer is then transferred to a computer numerically controlled (hereinafter "CNC") device 58 associated with the computer. Such a device is shown schematically in FIG. 19. The CNC device then replicates the finalized image from the computer screen to the pin mold 4. This replication process typically takes about 5 minutes. The CNC device typically utilizes a pusher device to engage and manipulate the pin mold. The pusher engages individual pin elements of the pin mold, or in some embodiments, the pusher may actually be configured to simultaneously engage multiple numbers of pins. The pusher element is displaced by the CNC device. As the pusher is displaced, the pusher correspondingly displaces the pin elements of the pin mold with which it is engaged.

Figure 13:
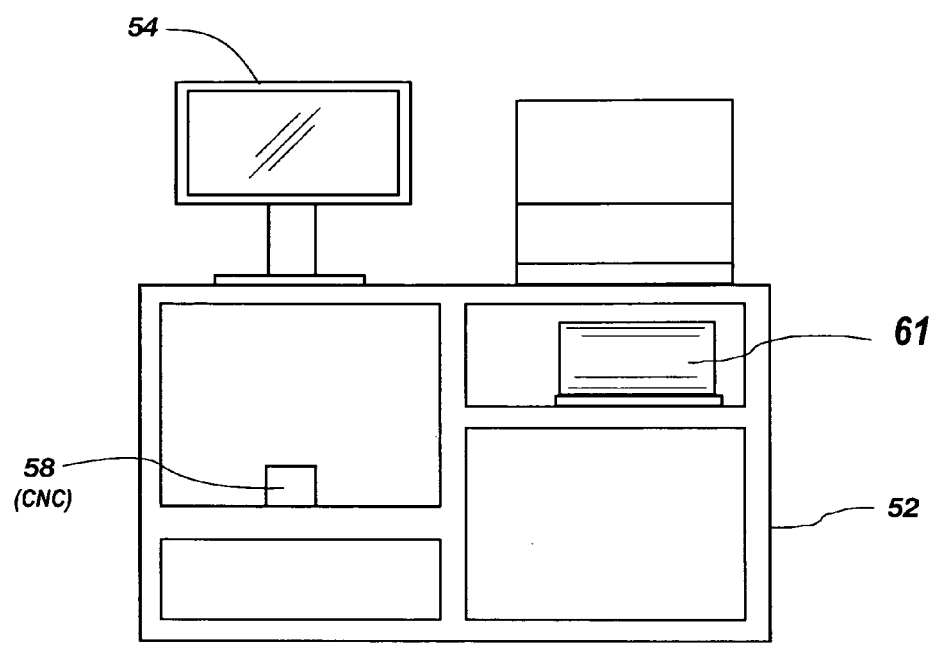
FIG. 13 is a front view of a work station designed to implement the steps of the instant method.
Figure 14:
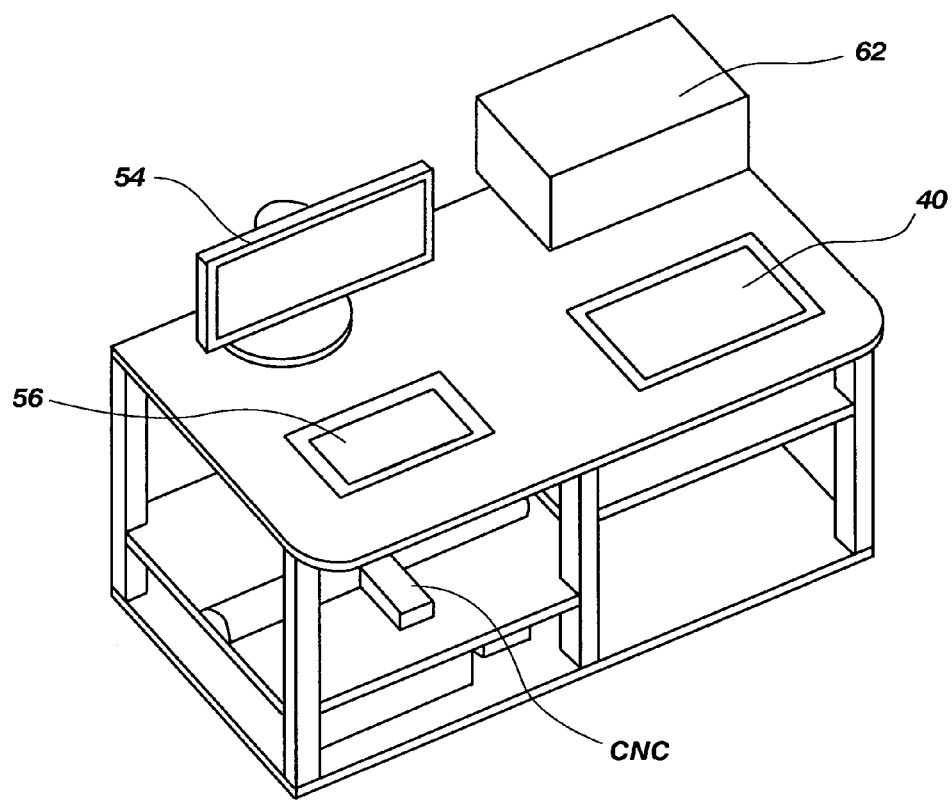
FIG. 14 is a perspective view of the work station of FIG. 13.

While the CNC pusher is displacing or otherwise setting the pins 12 according to the finalized digital image, the blank mold, which may be a thermo-forming material blank, is activated. In the present context, the term "activated" is intended to indicate preparing the blank to receive and retain an image imparted thereto. For example, for mold blanks fabricated from thermosetting materials, the term activate would include placing the mold blank in an oven or other suitable device for heating the blank to a temperature at which it is amenable to receiving the impression of a configurational surface to be replicated and preserving that impression upon cooling. In the illustrated construction of FIG. 13, the mold blank 4 is placed in conventional oven 62 to heat the blank to its appropriate activation temperature. In other aspects of the invention, the moldable blank may be constituted by a material which may be mixed with a catalyst to form a material suited to receive the impression of a configurational surface and thereafter preserve that impression as the material cures.

When the CNC device controlled pin setting process is complete and the pins 12 in the pin mold 4 are all set, the pin mold is taken out of the pin setting station 56 and placed into the vacuum chamber 40.

Next, a flat smoothing layer 3, which may be a material such as a 3/16 inch (0.424 cm) thick piece of silicone with a durometer of 10, is placed over that portion of the pin mold 4 which defines the configurational surface which is to be replicated. The smoothing material defines a surface area which generally corresponds to the surface area defined by the pins 12 of the pin mold 4. Accordingly, the smoothing layer 3 may be positioned cover the entire surface area of the pin mold 4 which defines the configurational surface area to be replicated.

Once the pin mold 4 and smoothing surface 3 are ready, the thermo-forming blank 4 is heated to the required temperature. The hot thermo-forming blank is taken out of the oven 62 and located in the correct position on top of the smoothing layer 3. The blanks 4 can also have a point and vector or other positioning marks to align them with the image and smoothing layer 3. Therefore, when the heated blank 4 comes out of the oven, its location on the smoothing layer can be defined by its point and vector and easily aligned.

Alignment of the blank 4 and pin mold 4 may be achieved in other ways within the scope of the disclosed systems and methods, such as utilizing other types of alignment marks besides a point and vector.

The combination of the pin mold 12, the smoothing layer 3 and the moldable blank 2 is then placed in association with two bladders 1 and 5. In the illustrated embodiment of FIG. 13, these two bladders are defined within the structure of a vacuum-forming station 40.

The vacuum station 40 defines a top having a bladder 42 which corresponds in this embodiment to the bladder 1 previously described. The bladder 42 is retained within a frame which seals the vacuum chamber when the top is pivoted or otherwise placed into a closed condition. When the combination of the pin-mold 4, the smoothing layer 3 and the moldable blank 2 are placed within the vacuum station 40 and the bladder 42 retaining top is brought down into a closed condition, the bladder 42 envelopes the upper portion of the combination and forms an air tight sealed containment about the upper portion of the combination.

The bottom 44 of the vacuum station 40 defines a bladder 46 which corresponds to the bladder 5 previously described. The bladder 46 engages against the pin mold 4 and further engages against the bladder 42 about the perimeter of the combination of the pin mold 4, smoothing layer 3 and the moldable blank 2. The two bladders 42 and 46 engage with one another to form a sealed enclosure about the combination of the pin mold 4, the smoothing layer 3 and the moldable blank 2. When the seal is tight, the operator evacuates the chamber, placing equal vacuum pressure on the top and bottom bladders 42 and 46. The two bladders 42 and 46 in turn apply uniformly distributed pressure to the combination formed by the pin mold 4, the smoothing layer 3 and the moldable blank 2. The thermo-forming blank, being in a heated and pliable condition, is then forced into engagement or otherwise formed around the smoothing layer 3. In turn the smoothing layer 3 is forced into engagement with the pin mold 4 and more specifically against the three dimensional configurational surface presented by the pin mold 4. Since the pin mold 4 is being retained in place by the pressure being applied against it by the bladder 46, the three dimensional configuration surface is urged against the smoothing layer with sufficient force that the configuration of that surface is transmitted through the smoothing layer 3 to the moldable blank 2 due to the forced engagement of the blank 2 against the smoothing layer 3.

Since the two bladders 42 and 46 operate to apply substantially identical pressure to the combination of the pin mold 4, smoothing layer 3 and the blank 2 the configuration of the pin mold 4 remains substantially unchanged during this procedure. The pins 12 remain in an undisplaced condition during the molding process due to the uniform pressure being applied to the mold 4 from opposing sides by the two bladders 42 and 46. Any discrepancies between the pressure being applied to the moldable blank 2 by the bladder 42 which are subsequently transmitted through the blank 2 through the smoothing layer 3 to the upper ends of the pins 12 and the pressure applied to the lower ends of the pins 12 by the bladder 1 are sufficiently small in magnitude that the frictional resistance to the pins' displacement, created by the element 14, is such as to minimize, if not preclude, the likelihood of any actual displacement of the pins 12.

The vacuum pump 61 of the vacuum station is left on, and, the chamber is under vacuum pressure until the material of the moldable blank 2 cools and the thermo-forming material is cured or otherwise set into position. In normal circumstances this may require approximately three minutes. In total a molded blank may be produced in approximately seven (7) minutes using the instant method and system.

Subsequently the vacuum is turned off, and the chamber 40 is opened. This permits a quantity of air to enter the chamber thereby returning the air pressure within the chamber to ambient pressure as the top 40 is placed in an open condition.

Alternatively, the chamber 40 is not perfectly sealed, so air leaks into the chamber without the use of valves.

With the moldable blank 2 having achieved a cured or set condition, the thermo-forming material of the blank 4 presents substantially the same configurational surface or shape as the computer image that was utilized to form the pin mold 4.

The instant invention also contemplates an integration of the various procedural steps of the invention to enable a minimized processing time by performing parallel activities of mold shaping, plastic heating, plastic shaping, mold resetting, and plastic cooling.

The dual bladder system dramatically reduces the vacuum forces on the pins and enables them to deform moldable blanks formed of thermo-forming materials with minimal friction. However, the invention also contemplates a mold assembly which does not include the dual bladder and instead relies on including structure within the pin mold being provided to create higher frictional resistance to the displacement of the pins in the pin mold.

Geometric variations in the top and bottom bladder, e.g., variations in thickness, as well as variations in the material properties of the materials utilized to construct the bladders can be utilized to adjust the distribution of forces applied to the moldable blank and the malleable mold.

The invention claimed is:

1. A molding assembly comprising:
   a malleable mold comprising
      a frame; and
      a plurality of pin elements displaceably secured within said frame, each of said pin elements defining a first end and a second end, said first ends of said plurality of pin elements being disposed to define a first surface and said second ends of said plurality of pin elements being disposed to define a second surface, said first surface defining a configurational surface to be replicated, and said second surface being disposed opposite from said first surface;
   a moldable blank positioned in proximity to said malleable mold;
   a first bladder in physical engagement with said moldable blank; and
   a device for applying force to said moldable blank and said malleable mold through intermediation of said first bladder;
   a second bladder positioned in physical engagement with said second ends of said pin elements which form said second surface of said malleable mold, said malleable mold and said moldable blank being positioned intermediate said first bladder and said second bladder;
   wherein upon an application of force on said first bladder, said bladders are repositioned physically closer to each other and said bladders function to substantially distribute force applied thereto over said malleable mold and said moldable blank to impart a shape of said configurational surface to said moldable blank and furthermore said second bladder applying a force to said second ends of said pin elements which form said second surface of said malleable mold to resist a substantial distortion of said first surface of said malleable mold.

2. The molding assembly of claim 1, further comprising a smoothing layer disposed between said first surface of said malleable mold and said first bladder.

3. The molding assembly of claim 1, wherein said device for applying force comprises a vacuum chamber, wherein upon an application of vacuum within said vacuum chamber, said first bladder functions to substantially distribute forces applied to said moldable blank resulting from said vacuum in order to preclude a substantial distortion of said malleable mold.

4. The molding assembly of claim 3, wherein said first bladder is incorporated within the structure of said vacuum chamber.

5. The molding assembly of claim 1, wherein said first ends of said plurality of pin elements are disposed to record in said first surface said configurational surface to be molded into said moldable blank.

6. The molding assembly of claim 5, wherein said frame further includes a resistance structure adapted for imparting a frictional resistance to a displacement of said pin elements relative to said frame.

7. The molding assembly of claim 6, wherein said resistance structure defines a plurality of lined conduits, wherein each of said pin elements is disposed within a respective said lined conduit, each of said conduits being lined with a material having a frictional coefficient high enough to counteract the gravitational weight of the pins and withstand deformation pressures put on the mold.

8. The molding assembly of claim 1, wherein said plurality of pin elements are physically disposed within said malleable mold such that said pin elements are within less than about 0.565 centimeters of one another proximate the first ends of said pin elements.

* * * * *